United States Patent [19]

Hsu et al.

[11] Patent Number: 5,598,576

[45] Date of Patent: Jan. 28, 1997

[54] AUDIO OUTPUT DEVICE HAVING DIGITAL SIGNAL PROCESSOR FOR RESPONDING TO COMMANDS ISSUED BY PROCESSOR BY EMULATING DESIGNATED FUNCTIONS ACCORDING TO COMMON COMMAND INTERFACE

[75] Inventors: Mark Hsu, San Jose; Yann Le Cornec, Fremont; Julien T. Nguyen, Redwood City, all of Calif.

[73] Assignee: Sigma Designs, Incorporated, Fremont, Calif.

[21] Appl. No.: 219,841

[22] Filed: Mar. 30, 1994

[51] Int. Cl.$^6$ .................................................. G06F 15/02
[52] U.S. Cl. .............................................. 395/822; 395/2.1
[58] Field of Search .................................. 395/250, 275, 395/325, 425, 822, 823, 825, 281, 2, 2.1

[56] References Cited

U.S. PATENT DOCUMENTS

| | | | |
|---|---|---|---|
| 4,414,620 | 11/1983 | Tsuchimoto et al. | 395/200.09 |
| 4,447,873 | 5/1984 | Price et al. | 395/250 |
| 4,663,730 | 5/1987 | Ikeda | 364/140 |
| 4,901,232 | 2/1990 | Harrington et al. | 395/826 |
| 5,111,292 | 5/1992 | Kuriacose et al. | 358/133 |
| 5,122,875 | 6/1992 | Raychaudhuri et al. | 358/133 |
| 5,168,356 | 12/1992 | Acampora et al. | 358/133 |
| 5,231,492 | 7/1993 | Dangi et al. | 358/143 |
| 5,276,684 | 1/1994 | Pearson | 395/855 |
| 5,276,807 | 1/1994 | Kodama et al. | 395/309 |
| 5,276,864 | 1/1994 | Hernandez et al. | 395/182.08 |
| 5,283,883 | 2/1994 | Mishler | 395/853 |
| 5,289,276 | 2/1994 | Siracusa et al. | 348/467 |
| 5,291,614 | 3/1994 | Baker et al. | 395/800 |
| 5,392,239 | 2/1995 | Margulis et al. | 365/189.01 |
| 5,416,749 | 5/1995 | Lai | 365/240 |
| 5,426,756 | 6/1995 | Shyi et al. | 395/486 |

OTHER PUBLICATIONS

DeVoney "Sound Boards: Let Windows Do the Talking", *Windows Sources* May 1993 p. 4.

*Primary Examiner*—Thomas C. Lee
*Assistant Examiner*—Moustafa Mohamed Meky
*Attorney, Agent, or Firm*—D'Alessandro & Ritchie

[57] ABSTRACT

An improved audio-output device coupleable to a computer system, in which a DSP operating under software control emulates a common command interface. The command interface has a set of registers that are made available to the CPU for reading and writing, even if there are no such physical registers available in the device. The DSP also performs tasks in addition to audio-output, even though the audio-output device is required to respond immediately to commands from the CPU. The audio-output device has a DSP for interpreting and executing commands received from the CPU, a local memory for storing data input to or output from the DSP, a bus-interface (BIF) element for coupling the DSP and memory to a system bus, and a direct memory access (DMA) element for transferring data between the local memory and the system bus. The local memory has an emulation region for emulating a set of named registers the CPU may read from and write into according to the command interface, and a communication region for transmitting messages between the CPU and the DSP. The emulation region is indicated by a base register and a set of offset values, and has a dynamically allocated set of registers for emulating the set of named registers the CPU may read from and write into.

13 Claims, 3 Drawing Sheets

AUDIO OUTPUT DEVICE HAVING DIGITAL SIGNAL PROCESSOR FOR RESPONDING TO COMMANDS ISSUED BY PROCESSOR BY EMULATING DESIGNATED FUNCTIONS ACCORDING TO COMMON COMMAND INTERFACE

BACKGROUND OF THE INVENTION

1. Field of the Invention

This invention relates to sound board emulation using a digital signal processor.

2. Description of Related Art

There has been a great deal of market demand for audio and video output from computer systems, particularly in the case of personal computer systems known as "PC"s. This has led to the availability of hardware devices for producing audio output in response to commands from a central processing unit (CPU). Such a device may be commonly integrated into a computer system by implementing it on an add-in board, and by coupling the add-in board to a system bus, such as the industry-standard architecture (ISA) or extended ISA (EISA) bus. When coupled to the system bus, the board may be commanded by the CPU, under control of software for producing and playing audio output.

One product for producing audio output is the "Sound Blaster" product, available from Creative Technology, Inc., of Milpitas, Calif. This product, and the interface by which the CPU may command it, has become popular with some segments of the personal computer industry, and its command interface is also commonly used by other devices.

It is desirable for makers of audio-output boards to have the same command interface. Makers of hardware and software for personal computer systems may rely, and will certainly prefer, that any audio-output board have the same command interface. Designer may also wish to avoid multiple versions of a product (designed for compatibility with more than one product's command interface), and may therefore provide a product which uses only one command interface.

One aspect of this common command interface is that it specifies certain named registers that the CPU may access on the audio-output board, either to read values from or to write values into. While this may be an acceptable way for the CPU to command the audio-output board, it is desirable that an audio-output board does not require actual physical registers to implement this aspect of the command interface. For example, an implementation in which these registers are simulated by other physical means may be less expensive, faster, or more easily upgraded.

It is also desirable that an audio-output board does not require an implementation using dedicated hardware for the functions it provides, and may instead be implemented using a digital signal processor (DSP) operating under software control. However, the common command interface described above generally requires that the audio-output board must be immediately responsive to commands from the CPU. This generally requires that the DSP must spend its time watching and waiting for, and responding to, the CPU, and that its additional computing power is therefore wasted.

Accordingly, it is an object of this invention to provide an improved audio-output device.

SUMMARY OF THE INVENTION

The invention provides an improved audio-output device that may be coupled to a computer system, in which a DSP operating under software control may emulate a common command interface. The command interface may comprise a set of registers that are made available to the CPU for reading and writing, even if there are no such physical registers available in the device. The DSP may also perform tasks in addition to audio-output, even though the audio-output device may be required to respond immediately to commands from the CPU.

In a preferred embodiment, the audio-output device may comprise a DSP for interpreting and executing commands received from the CPU, a local memory for storing data input to or output from the DSP, a bus-interface (BIF) element for coupling the DSP and memory to a system bus, and a direct memory access (DMA) element for transferring data between the local memory and the system bus. The local memory may comprise an emulation region for emulating a set of named registers the CPU may read from and write into according to the command interface, and a communication region for transmitting messages between the CPU and the DSP.

In a preferred embodiment, the emulation region may be indicated by a base register and a set of offset values, and may comprise a dynamically allocated set of registers for emulating the set of named registers the CPU may read from and write into. The communication region may comprise a set of registers for the BIF to indicate that a message has been received from the CPU for the DSP or is available for the CPU from the DSP. The local memory may also comprise a DMA transfer buffer for transferring data between the local memory and another memory coupled to the system bus.

DESCRIPTION OF THE PREFERRED EMBODIMENT

The invention may be understood in conjunction with a specification for the "Sound Blaster" device command interface, available from Creative Technology, Inc., as a document titled "The Developer Kit for Sound Blaster Series-User's Guide", hereby incorporated by reference as if fully set forth herein. However, those skilled in the art would recognize, after perusal of this application, that other command interfaces would be workable, and are within the scope and spirit of the invention.

SYSTEM INCLUDING EMULATION BOARD

Figure 1:
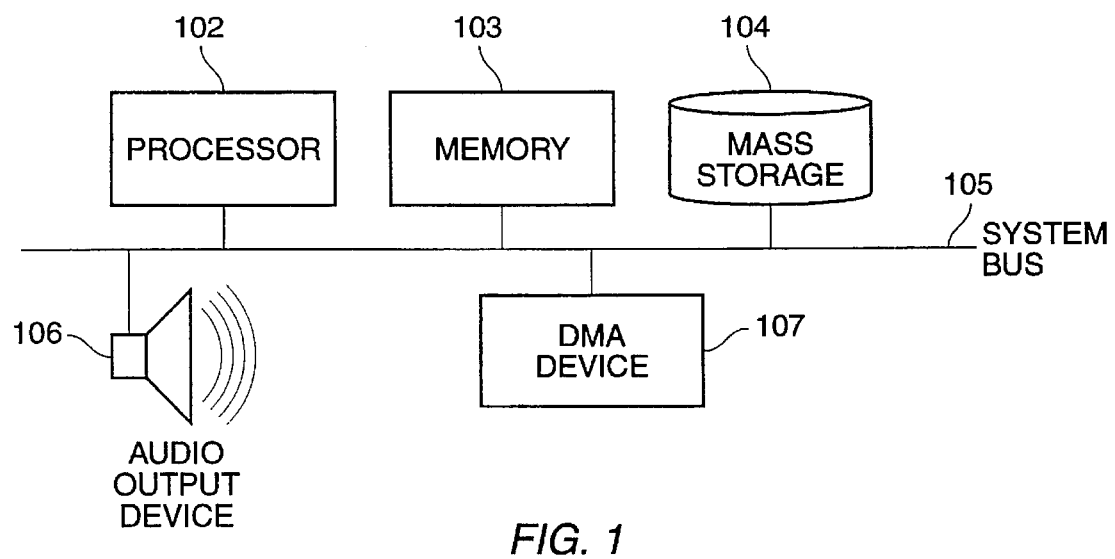
FIG. 1 shows a block diagram of a computer system including an emulation board.

FIG. 1 shows a block diagram of a computer system including an emulation board.

A computer system 101 may comprise a processor 102, memory 103, and mass storage 104, all coupled to a system bus 105. For example, in a preferred embodiment, the computer system 101 may comprise an IBM compatible PC, having an Intel 386 processor operating at 25 MHz or better, with at least 2 MB of RAM and at least 2 MB of space free on a magnetic disk drive mass storage unit, and having an ISA or EISA bus. Such systems are known in the art.

Those skilled in the art would readily understand, after perusal of this application, that the methods and techniques described for operation on a processor or computer system would be readily implemented on such a digital computer system without undue experimentation. Accordingly, detailed description of computer programming techniques or methods of implementation are not set forth herein, except where such techniques or methods are specific to the invention.

In a preferred embodiment, an audio-output device 106 may be implemented using an add-in board, such as a printed circuit board having a set of semiconductor circuits integrated onto a set of semiconductor "chips", with such chips coupled to each other or to a power source using printed circuits or other known wiring techniques. Such add-in boards are known in the art; indeed, many computer systems manufactured today include a plurality of receiving slots for coupling such add-in boards to the computer system and to the computer system bus.

In a preferred embodiment, the audio-output device 106 may be coupled to the system bus 105 using a known methods for coupling an add-in board to a system bus, such as the ISA or EISA specification for a device to bus coupling. The processor 102 may communicate with the audio-output device 106 by means of the bus 105; communication techniques therefor are known in the art. Alternatively, the processor 102 may communicate with the audio-output device 106 by means of reading from and writing to the memory 103; this is described in further detail herein.

In a preferred embodiment, when a software program, stored in memory 103 or in mass storage 104 and controlling the processor 102, desires to use the capabilities of the audio-output device 106, it may cause the processor 102 to generate a command to the audio-output device 106 in a format required by the command interface. In a preferred embodiment, the command interface may follow the common command interface disclosed herein by reference. The audio-output device 106 may respond to the command, such as by generating a designated sound sequence or by altering its (virtual) internal state, again as prescribed by the common command interface disclosed herein by reference.

EMULATION BOARD USING DIGITAL SIGNAL PROCESSOR

Figure 2:
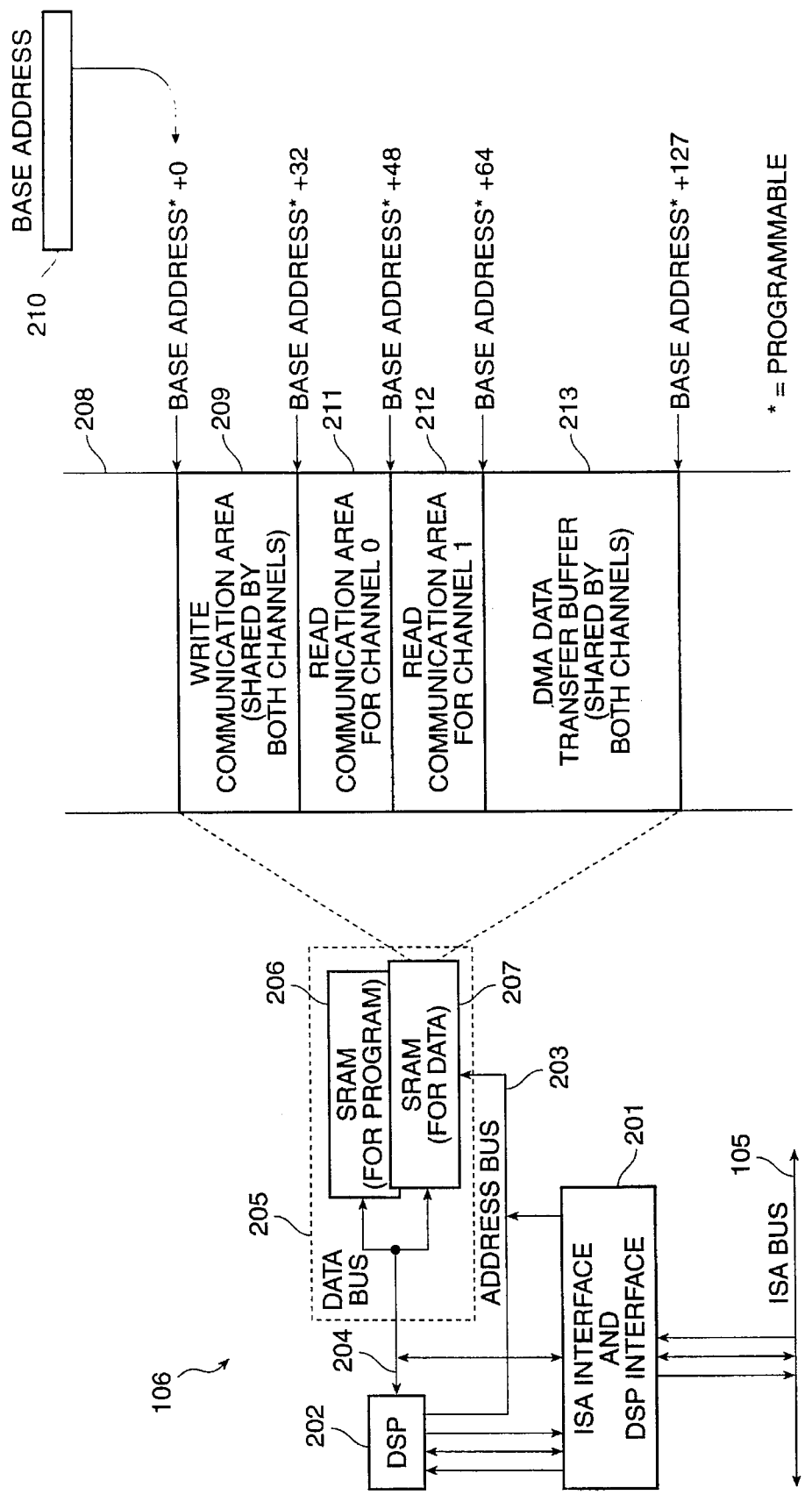
FIG. 2 shows a block diagram of an emulation board using a digital signal processor.

FIG. 2 shows a block diagram of an emulation board using a digital signal processor.

An audio-output device 106 may comprise a bus interface (BIF) element 201 coupled to the system bus 105, a digital signal processor (DSP) 202 coupled to the bus interface element 201, an internal address bus 203 coupled to the bus interface element 201 and to the DSP 202, an internal data bus 204, and an internal memory 205 coupled to the address bus 203. In a preferred embodiment, the internal memory 205 may comprise an internal program memory 206 and an internal data memory 207.

In a preferred embodiment, the internal memory 205 may comprise static random access memory (SRAM). However, those skilled in the art would recognize, after perusal of this application, that other types of memory would be workable, and are within the scope and spirit of the invention. Such other types of memory could comprise, for example, read only memory (ROM) or nonvolatile memory (NOVRAM) for the internal program memory 206, and could comprise, for example, dynamic RAM (DRAM) or video RAM (VRAM) for the internal data memory 207. A cache could also be coupled to the internal memory 205 (or to just the internal program memory 206 or the internal data memory 207), although in a preferred embodiment, a cache is not considered necessary.

The internal data memory 207 may comprise a set of addressable registers 208, so that when an address is presented to the internal memory 205 on the internal address bus 203, the internal data memory 207 may refer to one of the addressable registers 208, i.e., to read from or write into the named addressable register 208. In a preferred embodiment, the addressable registers 208 may comprise 16 bits each.

A subset of the internal data memory 207 may comprise a write communication area 209. The write communication area 209 may be designated by a base address register 210 (comprising a base address) for indicating a minimum address and an offset for indicating a maximum offset from the minimum address, both in the set of addressable registers 208 in the internal data memory 207. In a preferred embodiment, the minimum address and maximum offset are set so that 32 addressable registers 208 from <base address+0> to <base address+31> may comprise the write communication area 209.

Similarly, a subset of the internal data memory 207 may comprise a zeroth and a first read communication area 211 and 212 respectively. The zeroth and the first read communication areas 211 and 212 may each be designated by the base address register 210 for indicating a minimum address and an offset for indicating a maximum offset from the minimum address. In a preferred embodiment, the minimum address and maximum offset are set so that 16 addressable registers 208 from <base address+32> to <base address+47> may comprise the zeroth read communication area 211, and 16 addressable registers 208 from <base address+48> to <base address+63> may comprise the first read communication area 212.

Similarly, a subset of the internal data memory 207 may comprise a DMA data transfer buffer 213. The DMA data transfer buffer 213 may be designated by the base address register 210 for indicating a minimum address and an offset for indicating a maximum offset from the minimum address. In a preferred embodiment, the minimum address and maximum offset are set so that 64 addressable registers 208 from <base address +64> to <base address+127> may comprise the DMA data transfer buffer 213.

In a preferred embodiment a single base address register 210 is used to indicate a minimum address for the write communication area 209, for the zeroth and first read communication areas 211 and 212, and for the DMA data transfer buffer 213. However, it would be clear to those skilled in the art after perusal of this application that a plurality of base address registers 210 could be used as well, and that this is within the scope and spirit of the invention.

OPERATION OF THE EMULATION BOARD

In a preferred embodiment, the BIF 201 may receive a command from the processor 102 by means of the system bus 105. Communication by means of a system bus is known in the art. The BIF 201 may then decode the command to determine whether (1) data should be written into the internal data memory 207, (2) data should be read from the internal data memory 207 and presented to the processor 102, (3) the DSP 202 should be interrupted. In a preferred embodiment, a command from the processor 102 may require one or more of these actions.

In case (1), data should be written into the internal data memory 207, the BIF 201 may determine whether the data is available from the command itself. For example, the command may instruct the audio-output device 106 to put a designated value into a designated register, and may designate that value in the body of the command itself. If so, the BIF 201 maps the designated register into an addressable register 208 in the write communication area 209, and writes the data from the command directly into the mapped addressable register 208.

Alternatively, the BIF 201 may determine that the data is not available from the command, and must be retrieved from the system memory 103. For example, the command may instruct the audio-output device 106 to move data from the system memory 103 into a designated register. If so, the BIF 201 causes a DMA device 107 (FIG. 1) to read the data from the system memory 103 by means of the system bus 105 and to write the data into the DMA data transfer buffer 213 by means of the internal data bus 204. The DMA device 107 may signal the BIF 201 when the data transfer is complete, whereupon the BIF 201 may proceed as in the case where the data was available from the command itself.

In case (2), data should be read from the internal data memory 207, the BIF 201 may determine which addressable register 208 in the internal data memory 207 is to be read from. Generally, the command may designate a particular register for the audio-output device 106. The BIF 201 may map the designated register into a designated addressable register 208 in the zeroth or first read communication areas 211 or 212. The BIF 201 may read the data from the mapped designated addressable register 208 and may transfer the data to the processor 102 by means of the system bus 105.

In case (3), the DSP 202 should be interrupted, the BIF 201 may write information about the command into a designated addressable register 208 in the write communication area 209 and may signal the DSP 202 that an operation should be performed. The BIF 201 may indicate what operation is specified by the command, and what data is to be operated upon. In a preferred embodiment, the BIF 201 may signal the DSP 202 by setting a bit in a designated addressable register 208 in the write communication area 209 for the DSP 202 to see.

The DSP 202 may respond to the interrupt by reading the designated addressable register 208 in the write communication area 209, performing the designated operation, and writing the answers into a designated addressable register 208 in the zeroth or first read communication area 211 or 212. The DSP 202 may then signal the BIF 201 that the operation is complete. In a preferred embodiment, the DSP may signal the BIF 201 by setting a bit in a designated addressable register 208 in the zeroth or first read communication area 211 or 212 for the BIF 201 to see.

The zeroth and first read communication areas 211 and 212 may be used so the BIF 201 may read data for presentation to the processor 102 at the same time the DSP 202 is performing an operation and writing output data, also for presentation to the processor 102. However, it will be clear to those skilled in the art that other methods of parallel operation by the BIF 201 and the DSP 202, and other methods of synchronization of the two, would be workable, and are within the scope and spirit of the invention.

BIF/DSP COMMUNICATION DATA FORMAT

Figure 3:
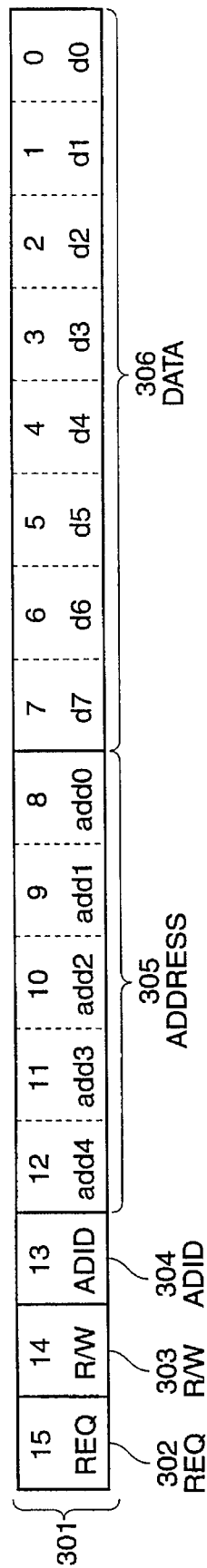
FIG. 3 shows a block diagram of a data word for communication between the BIF 201 and the DSP 202.

FIG. 3 shows a block diagram of a data word for communication between the BIF 201 and the DSP 202.

In a preferred embodiment, the BIF 201 may comprise the Piccolo product, available from Sigma Designs Corporation of Fremont, Calif., and the DSP 202 may comprise an AD2105 chip, available from Analog Devices of Norwood, Mass. However, those skilled in the art would recognize, after perusal of this application, that other implementations of the BIF 201 or the DSP 202 would be workable, and are within the scope and spirit of the invention. For example, the BIF 201 may comprise any processor device having the functions specified herein, and may therefore comprise a processor chip, an ASIC, an FPGA, or other suitable hardware. For example, the DSP 202 may comprise any processor device having the functions specified herein, and may therefore comprise a processor chip, an ASIC, an FPGA, or other suitable hardware. The BIF 201 and DSP 202 may even be combined into a single device, so long as two streams of execution may operate separately to perform the two sets of functions specified herein.

A data word 301 for communication between the BIF 201 and the DSP 202 may be held in an addressable register 208 in the internal data memory 207. In a preferred embodiment, this addressable register 208 may be located in the write communication area 209. The data word 301 may comprise a REQ bit 302 for indicating whether a command has been received from the processor 102, a R/W bit 303 for indicating whether the command is a read command or a write command, an ADID field 304 for indicating which one of a plurality of audio-output registers are to be emulated, an address field 305 for indicating which one of a plurality of emulated registers is designated by the command, and a data field 306 for indicating data communicated by the command.

In a preferred embodiment, two sets of audio-output registers may be emulated, to emulate two separate channels of operation for the audio-output device 106.

In a preferred embodiment, the BIF 201 may set the REQ bit 302 to indicate that the data field 306 comprises valid data. The DSP 202 may clear the REQ bit 302 to indicate that it has read or processed that data, and by implication, that the 3 BIF 201 may overwrite the data field 306.

In a preferred embodiment, the BIF 201 may set the R/W bit 303 to indicate that a write command has been designated by the processor 102, or may clear the R/W bit 303 to indicate that a read command has been designated.

In a preferred embodiment, the BIF 201 may set the ADID field 304 to indicate which one of a plurality of audio-output registers are to be emulated. In a preferred embodiment, the ADID field 304 may comprise a single bit, and there may be two sets of audio-output registers to be emulated.

In a preferred embodiment, the BIF 201 may set the address field 305 to indicate which one of a plurality of emulated registers is designated by the command. In a preferred embodiment, the address field 305 may comprise five bits and there may be a set of 32 emulated registers in each set.

In a preferred embodiment, the BIF 201 may set the data field 306 to indicate data communicated by the command, and the DSP 202 may read the data field 306 as part of processing the command. In a preferred embodiment, the data field 306 may comprise eight bits.

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:
1. A computer system, comprising:
a system bus, a processor coupled to said system bus, a system memory coupled to said system bus, and an audio-output device coupled to said system bus, said audio-output device comprising
  a bus-interface element having means for coupling to said system bus, means for receiving a plurality of commands issued by said processor, and means for transmitting data to said processor;
  a digital signal processor coupled to said bus-interface element, said digital signal processor having means for interpreting and executing instructions, means for receiving from said bus-interface element a signal indicative of receipt of at least one of said plurality of commands, and means for sending to said bus-interface element a signal indicative of completion of said at least one command;
  a local memory coupled to said bus-interface element and to said digital signal processor, said local memory having a communication area;
  said bus-interface element having means for writing to said communication area upon receipt of a first subset of said plurality of commands, and means for reading from said communication area upon receipt of a second subset of said plurality of commands; and
  said digital signal processor having means for reading from and writing to said communication area in response to said at least one command;
said communication area comprising a plurality of addressable registers pointed to by a base register, said base register comprising a dynamically allocable value indicative of an address of one of said plurality of addressable registers, wherein said plurality of commands issued by said processor are in a format required by a common command interface for said audio-output device, and wherein said Digital Signal Processor is disposed to respond to said commands by emulating designated functions according to said common command interface.

2. An audio-output device for coupling to a computer system, said system having a system bus, a processor coupled to said system bus, said audio-output device comprising:
  a bus-interface element having means for coupling to said system bus, means for receiving a plurality of commands issued by said processor, and means for transmitting data to said processor;
  a digital signal processor coupled to said bus-interface element, said digital signal processor having means for interpreting and executing instructions, means for receiving from said bus-interface element a signal indicative of receipt of at least one of said plurality of commands, and means for sending to said bus-interface element a signal indicative of completion of said at least one command;
  a memory coupled to said bus-interface element and to said digital signal processor, said memory having a communication area;
  said bus-interface element having means for writing to said communication area upon receipt of a first subset of said plurality of commands, and means for reading from said communication area upon receipt of a second subset of said plurality of commands;
  said digital signal processor having means for reading from and writing to said communication area in response to said at least one command;
  said communication area comprising a plurality of addressable registers pointed to by a base register, said base register comprising a dynamically allocable value indicative of an address of one of said plurality of addressable registers;
  a read communication area having a zeroth and a first read communication areas, said zeroth and said first read communication areas located in said memory at a zeroth offset and a first offset from said address, respectively; and
  a write communication area located in said memory at a second offset from said address, wherein said base address register providing a minimum address and an offset for indicating said read communication area and said write communication area, wherein said zeroth and first read communication areas enabling said bus-interface element to read data from said zeroth or first read communication area for presentation to said processor at the same time said digital signal processor is performing an operation and writing output data at said zeroth or first read communication area also for presentation to said processor.

3. An audio-output device, as in claim 2, wherein said plurality of commands issued by said processor are in a format required by a common command interface for said audio-output device, and wherein said digital signal processor is disposed to respond to said commands by emulating designated functions according to said common command interface.

4. An audio-output device, as in claim 2,
  wherein said plurality of commands issued by said processor are in a format required by a common command interface for said audio output device, and wherein said audio-output device is disposed to respond to said commands by generating a designated sound sequence according to said common command interface.

5. An audio-output device as in claim 3, comprising
  a buffer located in said memory, said buffer providing for a data word comprising a request bit for indicating whether a command has been received from the processor, a read/write bit for indicating whether said command is a read command or a write command, an register pointer field for indicating which one of a plurality of audio-output registers are to be emulated, an address field for indicating which one of said plurality of emulated registers is designated by said command, and a data field for indicating data communicated by said command;
  a system memory coupled to said system bus; and
  a DMA transfer device coupled to said memory and to said system memory, said DMA transfer device being responsive to said command for transferring data between said memory and said system memory.

6. An audio-output device as in claim 2, wherein said means for receiving from said bus-interface element comprises a data communication word, said data communication word having a part indicating one of a set of registers for said digital signal processor to emulate and a part indicating data from said processor.

7. An audio-output device as in claim 6, wherein said data communication word comprises a part having a first state indicating said receipt of said at least one of said plurality of commands, and a second state indicating said completion of said at least one command.

8. An audio-output device as in claim 6, wherein said data communication word comprises a part indicating a read command or a write command, and a part indicating one of a plurality of said sets of registers for said digital signal processor to emulate.

9. An audio-output device as in claim 2, wherein said memory comprises a program memory and a data memory.

10. An audio-output device as in claim 2, wherein said memory is coupled to said system bus.

11. An audio-output device as in claim 2, wherein said memory is not coupled to said system bus.

12. An audio-output device as in claim 2, wherein said signal indicative of receipt and said signal indicative of completion comprise signals in a configuration of said digital signal processor and said bus-interface unit in which a polling operation is used with said digital signal processor for new commands and for completion of commands.

13. An audio-output device as in claim 2, wherein said signal indicative of receipt and said signal indicative of completion comprise interrupt signals.

* * * * *

UNITED STATES PATENT AND TRADEMARK OFFICE
CERTIFICATE OF CORRECTION

PATENT NO. : 5,598,576
DATED : January 28, 1997
INVENTOR(S) : Mark Hsu, Yann Le Cornec, Julien T. Nguyen It is certified that error appears in the above-indentified patent and that said Letters Patent is hereby corrected as shown below:

---In Col. 6, line 40, after the first instance of "the" delete "3".

---In Col. 1, line 34, replace "Designer" with --Designers--.

---In Col. 3, line 22, replace "methods" with --method--.

Signed and Sealed this

Fifteenth Day of April, 1997

*Attest:*

BRUCE LEHMAN

*Attesting Officer*  *Commissioner of Patents and Trademarks*